United States Patent
Markuze et al.

(10) Patent No.: US 12,373,237 B2
(45) Date of Patent: Jul. 29, 2025

(54) LOGICAL MEMORY ADDRESSING BY SMART NIC ACROSS MULTIPLE DEVICES

(71) Applicant: VMware LLC, Palo Alto, CA (US)

(72) Inventors: Alex Markuze, Rosh HaAyin (IL); Shay Vargaftik, Herzliya (IL); Igor Golikov, Kfar Saba (IL); Yaniv Ben-Itzhak, Afek (IL); Avishay Yanai, Petach-Tikva (IL)

(73) Assignee: VMware LLC, Palo Alto, CA (US)

( * ) Notice: Subject to any disclaimer, the term of this patent is extended or adjusted under 35 U.S.C. 154(b) by 495 days.

(21) Appl. No.: 17/826,911

(22) Filed: May 27, 2022

(65) Prior Publication Data

US 2023/0385094 A1    Nov. 30, 2023

(51) Int. Cl.
G06F 9/455    (2018.01)

(52) U.S. Cl.
CPC .. *G06F 9/45558* (2013.01); *G06F 2009/4557* (2013.01); *G06F 2009/45583* (2013.01); *G06F 2009/45595* (2013.01)

(58) Field of Classification Search
None
See application file for complete search history.

(56) References Cited

U.S. PATENT DOCUMENTS

| | | |
|---|---|---|
| 5,884,313 A | 3/1999 | Talluri et al. |
| 5,887,134 A | 3/1999 | Ebrahim |
| 5,974,547 A | 10/1999 | Klimenko |
| 6,141,749 A | 10/2000 | Coss et al. |
| 6,219,699 B1 | 4/2001 | McCloghrie et al. |
| 6,393,483 B1 | 5/2002 | Latif et al. |
| 6,496,935 B1 | 12/2002 | Fink et al. |
| 6,594,704 B1 | 7/2003 | Birenback et al. |
| 6,738,821 B1 | 5/2004 | Wilson et al. |
| 6,856,995 B1 | 2/2005 | Bitayo et al. |

(Continued)

FOREIGN PATENT DOCUMENTS

| | | |
|---|---|---|
| CA | 2672100 A1 | 6/2008 |
| CA | 2918551 A1 | 7/2010 |

(Continued)

OTHER PUBLICATIONS

W. Yongqing and Z. Minxuan, "Fully memory based address translation in user-level network interface," 2011 IEEE 3rd International Conference on Communication Software and Networks, Xi'an, China, 2011, pp. 351-355. (Year: 2011).*

(Continued)

*Primary Examiner* — Frank D Mills
(74) *Attorney, Agent, or Firm* — Quarles & Brady LLP

(57) ABSTRACT

Some embodiments provide a method for sending data messages at a network interface controller (NIC) of a computer. From a network stack executing on the computer, the method receives (i) a header for a data message to send and (ii) a logical memory address of a payload for the data message. The method translates the logical memory address into a memory address for accessing a particular one of multiple devices connected to the computer. The method reads payload data from the memory address of the particular device. The method sends the data message with the header received from the network stack and the payload data read from the particular device.

20 Claims, 8 Drawing Sheets

(56) References Cited

U.S. PATENT DOCUMENTS

| | | |
|---|---|---|
| 6,880,089 B1 | 4/2005 | Bommareddy et al. |
| 6,963,921 B1 | 11/2005 | Yang et al. |
| 7,055,173 B1 | 5/2006 | Chaganty et al. |
| 7,079,544 B2 | 7/2006 | Wakayama et al. |
| 7,136,926 B1 | 11/2006 | Iyer et al. |
| 7,349,382 B2 | 3/2008 | Marimuthu et al. |
| 7,424,710 B1 | 9/2008 | Nelson et al. |
| 7,512,071 B2 | 3/2009 | Goldschmidt et al. |
| 7,606,260 B2 | 10/2009 | Oguchi et al. |
| 7,760,733 B1 | 7/2010 | Eiriksson et al. |
| 7,774,502 B2 | 8/2010 | Murthy et al. |
| 7,818,452 B2 | 10/2010 | Matthews et al. |
| 7,849,168 B2 | 12/2010 | Utsunomiya et al. |
| 7,853,998 B2 | 12/2010 | Blaisdell et al. |
| 7,913,294 B1 | 3/2011 | Maufer et al. |
| 7,948,986 B1 | 5/2011 | Ghosh et al. |
| 8,032,933 B2 | 10/2011 | Turley et al. |
| 8,108,550 B2 | 1/2012 | Lahoti et al. |
| 8,145,768 B1 | 3/2012 | Hawthorne |
| 8,190,767 B1 | 5/2012 | Maufer et al. |
| 8,194,674 B1 | 6/2012 | Pagel et al. |
| 8,365,294 B2 | 1/2013 | Ross |
| 8,442,059 B1 | 5/2013 | Glesia et al. |
| 8,615,009 B1 | 12/2013 | Ramamoorthi et al. |
| 8,660,129 B1 | 2/2014 | Brendel et al. |
| 8,825,900 B1 | 9/2014 | Gross, IV et al. |
| 8,856,518 B2 | 10/2014 | Sridharan et al. |
| 8,930,529 B1 | 1/2015 | Wang et al. |
| 8,931,047 B2 | 1/2015 | Wanser et al. |
| 9,008,082 B2 | 4/2015 | Dyke |
| 9,008,085 B2 | 4/2015 | Kamble et al. |
| 9,015,823 B2 | 4/2015 | Koponen et al. |
| 9,047,109 B1 | 6/2015 | Wang et al. |
| 9,116,727 B2 | 8/2015 | Benny et al. |
| 9,135,044 B2 | 9/2015 | Maharana |
| 9,143,582 B2 | 9/2015 | Banavalikar et al. |
| 9,148,895 B2 | 9/2015 | PalChaudhuri et al. |
| 9,152,593 B2 | 10/2015 | Galles |
| 9,154,327 B1 | 10/2015 | Marino et al. |
| 9,197,551 B2 | 11/2015 | DeCusatis et al. |
| 9,231,849 B2 | 1/2016 | Hyoudou et al. |
| 9,325,739 B1 | 4/2016 | Roth et al. |
| 9,378,161 B1 | 6/2016 | Dalal et al. |
| 9,380,027 B1 | 6/2016 | Lian et al. |
| 9,419,897 B2 | 8/2016 | Cherian et al. |
| 9,460,031 B1 | 10/2016 | Dalal et al. |
| 9,621,516 B2 | 4/2017 | Basak et al. |
| 9,634,990 B2 | 4/2017 | Lee |
| 9,692,698 B2 | 6/2017 | Cherian et al. |
| 9,729,512 B2 | 8/2017 | Jain et al. |
| 9,755,903 B2 | 9/2017 | Masurekar et al. |
| 9,806,948 B2 | 10/2017 | Masurekar et al. |
| 9,825,913 B2 | 11/2017 | Jain et al. |
| 9,916,269 B1 | 3/2018 | Machulsky et al. |
| 10,050,884 B1 | 8/2018 | Dhanabalan et al. |
| 10,142,127 B2 | 11/2018 | Cherian et al. |
| 10,162,793 B1 | 12/2018 | BShara et al. |
| 10,193,771 B2 | 1/2019 | Koponen et al. |
| 10,284,478 B2 | 5/2019 | Yokota |
| 10,341,296 B2 | 7/2019 | Bhagwat et al. |
| 10,534,629 B1 | 1/2020 | Pierre et al. |
| 10,567,308 B1 | 2/2020 | Subbiah et al. |
| 10,873,566 B2 | 12/2020 | Han |
| 10,997,106 B1 | 5/2021 | Bandaru et al. |
| 11,005,755 B2 | 5/2021 | Yu et al. |
| 11,019,030 B2 | 5/2021 | Jain et al. |
| 11,038,845 B2 | 6/2021 | Han |
| 11,108,593 B2 | 8/2021 | Cherian et al. |
| 11,221,972 B1 | 1/2022 | Raman et al. |
| 11,385,981 B1 | 7/2022 | Silakov et al. |
| 11,593,278 B2 | 2/2023 | Kim et al. |
| 11,606,310 B2 | 3/2023 | Ang et al. |
| 11,636,053 B2 | 4/2023 | Kim et al. |
| 11,677,719 B2 | 6/2023 | Han |
| 11,716,383 B2 | 8/2023 | Kim et al. |
| 2002/0069245 A1 | 6/2002 | Kim |
| 2003/0005144 A1 | 1/2003 | Engel et al. |
| 2003/0093481 A1 | 5/2003 | Mitchell et al. |
| 2003/0097589 A1 | 5/2003 | Syvanne |
| 2003/0123452 A1 | 7/2003 | Cox et al. |
| 2003/0130833 A1 | 7/2003 | Brownell et al. |
| 2003/0140124 A1 | 7/2003 | Burns |
| 2003/0145114 A1 | 7/2003 | Gertner |
| 2003/0161272 A1 | 8/2003 | Teplitsky |
| 2003/0200290 A1 | 10/2003 | Zimmerman et al. |
| 2003/0212900 A1 | 11/2003 | Liu et al. |
| 2003/0217119 A1 | 11/2003 | Raman et al. |
| 2004/0022259 A1 | 2/2004 | Tuchow |
| 2004/0049701 A1 | 3/2004 | Pennec et al. |
| 2005/0053079 A1 | 3/2005 | Havala |
| 2005/0114337 A1 | 5/2005 | Lunteren |
| 2005/0198125 A1 | 9/2005 | Beck et al. |
| 2005/0229246 A1 | 10/2005 | Rajagopal et al. |
| 2005/0238022 A1 | 10/2005 | Panigrahy |
| 2006/0002386 A1 | 1/2006 | Yik et al. |
| 2006/0029056 A1 | 2/2006 | Perera et al. |
| 2006/0041894 A1 | 2/2006 | Cheng et al. |
| 2006/0191003 A1 | 8/2006 | Bahk et al. |
| 2006/0206603 A1 | 9/2006 | Rajan et al. |
| 2006/0206655 A1 | 9/2006 | Chappell et al. |
| 2006/0236054 A1 | 10/2006 | Kitamura |
| 2007/0011734 A1 | 1/2007 | Balakrishnan et al. |
| 2007/0056038 A1 | 3/2007 | Lok |
| 2007/0061492 A1 | 3/2007 | Riel |
| 2007/0174850 A1 | 7/2007 | Zur |
| 2008/0008202 A1 | 1/2008 | Terrell et al. |
| 2008/0028097 A1 | 1/2008 | Makela |
| 2008/0072305 A1 | 3/2008 | Casado et al. |
| 2008/0086620 A1 | 4/2008 | Morris |
| 2008/0163207 A1 | 7/2008 | Reumann et al. |
| 2008/0267177 A1 | 10/2008 | Johnson et al. |
| 2008/0289028 A1 | 11/2008 | Jansen et al. |
| 2008/0298274 A1 | 12/2008 | Takashige et al. |
| 2009/0007251 A1 | 1/2009 | Abzarian et al. |
| 2009/0089537 A1 | 4/2009 | Vick et al. |
| 2009/0119087 A1 | 5/2009 | Ang et al. |
| 2009/0129271 A1 | 5/2009 | Ramankutty et al. |
| 2009/0129394 A1 | 5/2009 | Bar-Kovetz et al. |
| 2009/0150521 A1 | 6/2009 | Tripathi |
| 2009/0161547 A1 | 6/2009 | Riddle et al. |
| 2009/0161673 A1 | 6/2009 | Breslau et al. |
| 2009/0235325 A1 | 9/2009 | Dimitrakos et al. |
| 2009/0249470 A1 | 10/2009 | Litvin et al. |
| 2009/0249472 A1 | 10/2009 | Litvin et al. |
| 2009/0327781 A1 | 12/2009 | Tripathi |
| 2010/0014526 A1 | 1/2010 | Chavan et al. |
| 2010/0037311 A1 | 2/2010 | He et al. |
| 2010/0070677 A1 | 3/2010 | Thakkar |
| 2010/0100616 A1 | 4/2010 | Bryson et al. |
| 2010/0115174 A1 | 5/2010 | Akyol et al. |
| 2010/0115208 A1 | 5/2010 | Logan |
| 2010/0125667 A1 | 5/2010 | Soundararajan |
| 2010/0165874 A1 | 7/2010 | Brown et al. |
| 2010/0257580 A1 | 10/2010 | Zhao |
| 2010/0275199 A1 | 10/2010 | Smith et al. |
| 2010/0287306 A1 | 11/2010 | Matsuda |
| 2011/0016467 A1 | 1/2011 | Kane |
| 2011/0022695 A1 | 1/2011 | Dalal et al. |
| 2011/0060859 A1 | 3/2011 | Shukla et al. |
| 2011/0072486 A1 | 3/2011 | Hadar et al. |
| 2011/0103259 A1 | 5/2011 | Aybay et al. |
| 2011/0113467 A1 | 5/2011 | Agarwal et al. |
| 2011/0134920 A1 | 6/2011 | Dyke |
| 2011/0219170 A1 | 9/2011 | Frost et al. |
| 2011/0225647 A1 | 9/2011 | Dilley et al. |
| 2011/0246637 A1 | 10/2011 | Murakami |
| 2012/0042138 A1 | 2/2012 | Eguchi et al. |
| 2012/0072909 A1 | 3/2012 | Malik et al. |
| 2012/0079478 A1 | 3/2012 | Galles et al. |
| 2012/0096459 A1 | 4/2012 | Miyazaki |
| 2012/0163388 A1 | 6/2012 | Goel et al. |
| 2012/0167082 A1 | 6/2012 | Kumar et al. |
| 2012/0207039 A1 | 8/2012 | Srinivasan et al. |
| 2012/0207174 A1 | 8/2012 | Shieh |

(56) References Cited

U.S. PATENT DOCUMENTS

| | | |
|---|---|---|
| 2012/0240182 A1 | 9/2012 | Narayanaswamy et al. |
| 2012/0259953 A1 | 10/2012 | Gertner |
| 2012/0278584 A1 | 11/2012 | Nagami et al. |
| 2012/0290703 A1 | 11/2012 | Barabash et al. |
| 2012/0320918 A1 | 12/2012 | Fomin et al. |
| 2013/0007740 A1 | 1/2013 | Kikuchi et al. |
| 2013/0033993 A1 | 2/2013 | Cardona et al. |
| 2013/0044631 A1 | 2/2013 | Biswas et al. |
| 2013/0058346 A1 | 3/2013 | Sridharan et al. |
| 2013/0061047 A1 | 3/2013 | Sridharan et al. |
| 2013/0073702 A1 | 3/2013 | Umbehocker |
| 2013/0073743 A1 | 3/2013 | Ramasamy et al. |
| 2013/0125122 A1 | 5/2013 | Hansen |
| 2013/0125230 A1 | 5/2013 | Koponen et al. |
| 2013/0145106 A1 | 6/2013 | Kan |
| 2013/0163594 A1 | 6/2013 | Sharma et al. |
| 2013/0227097 A1 | 8/2013 | Yasuda et al. |
| 2013/0227550 A1 | 8/2013 | Weinstein et al. |
| 2013/0265883 A1 | 10/2013 | Henry et al. |
| 2013/0311663 A1 | 11/2013 | Kamath et al. |
| 2013/0318219 A1 | 11/2013 | Kancherla |
| 2013/0318268 A1 | 11/2013 | Dalal et al. |
| 2013/0332983 A1 | 12/2013 | Koorevaar et al. |
| 2013/0346583 A1 | 12/2013 | Low et al. |
| 2014/0003442 A1 | 1/2014 | Hernandez et al. |
| 2014/0056151 A1 | 2/2014 | Petrus et al. |
| 2014/0067763 A1 | 3/2014 | Jorapurkar et al. |
| 2014/0068602 A1 | 3/2014 | Gember et al. |
| 2014/0074799 A1 | 3/2014 | Karampuri et al. |
| 2014/0098815 A1 | 4/2014 | Mishra et al. |
| 2014/0115578 A1 | 4/2014 | Cooper et al. |
| 2014/0123211 A1 | 5/2014 | Wanser et al. |
| 2014/0164595 A1 | 6/2014 | Bray et al. |
| 2014/0195666 A1 | 7/2014 | Dumitriu et al. |
| 2014/0201305 A1 | 7/2014 | Dalal et al. |
| 2014/0208075 A1 | 7/2014 | McCormick, Jr. |
| 2014/0215036 A1 | 7/2014 | Elzur |
| 2014/0244983 A1 | 8/2014 | McDonald et al. |
| 2014/0245296 A1 | 8/2014 | Sethuramalingam et al. |
| 2014/0245423 A1 | 8/2014 | Lee |
| 2014/0269712 A1 | 9/2014 | Kidambi |
| 2014/0269754 A1 | 9/2014 | Eguchi et al. |
| 2014/0281030 A1 | 9/2014 | Cui et al. |
| 2014/0282855 A1 | 9/2014 | Clark et al. |
| 2014/0330977 A1 | 11/2014 | Bemmel |
| 2014/0373148 A1 | 12/2014 | Nelms et al. |
| 2014/0376367 A1 | 12/2014 | Jain et al. |
| 2015/0007317 A1 | 1/2015 | Jain |
| 2015/0016300 A1 | 1/2015 | Devireddy et al. |
| 2015/0019748 A1 | 1/2015 | Gross, IV et al. |
| 2015/0020067 A1 | 1/2015 | Brant et al. |
| 2015/0033222 A1 | 1/2015 | Hussain et al. |
| 2015/0052280 A1 | 2/2015 | Lawson |
| 2015/0082417 A1 | 3/2015 | Bhagwat et al. |
| 2015/0117445 A1 | 4/2015 | Koponen et al. |
| 2015/0156250 A1 | 6/2015 | Varshney et al. |
| 2015/0172183 A1 | 6/2015 | DeCusatis et al. |
| 2015/0200808 A1 | 7/2015 | Gourlay et al. |
| 2015/0212892 A1 | 7/2015 | Li et al. |
| 2015/0215207 A1 | 7/2015 | Qin et al. |
| 2015/0222547 A1 | 8/2015 | Hayut et al. |
| 2015/0237013 A1 | 8/2015 | Bansal et al. |
| 2015/0242134 A1 | 8/2015 | Takada et al. |
| 2015/0261556 A1 | 9/2015 | Jain et al. |
| 2015/0261720 A1 | 9/2015 | Kagan et al. |
| 2015/0281178 A1 | 10/2015 | Raman et al. |
| 2015/0281179 A1 | 10/2015 | Raman et al. |
| 2015/0326532 A1 | 11/2015 | Grant et al. |
| 2015/0347231 A1 | 12/2015 | Gopal et al. |
| 2015/0358288 A1 | 12/2015 | Jain et al. |
| 2015/0358290 A1 | 12/2015 | Jain et al. |
| 2015/0381494 A1 | 12/2015 | Cherian et al. |
| 2015/0381495 A1 | 12/2015 | Cherian et al. |
| 2016/0006696 A1 | 1/2016 | Donley et al. |
| 2016/0092108 A1 | 3/2016 | Karaje et al. |
| 2016/0134702 A1 | 5/2016 | Gertner |
| 2016/0142320 A1 | 5/2016 | Gyllenhammer et al. |
| 2016/0156591 A1 | 6/2016 | Zhou et al. |
| 2016/0162302 A1 | 6/2016 | Warszawski et al. |
| 2016/0162438 A1 | 6/2016 | Hussain et al. |
| 2016/0179579 A1 | 6/2016 | Amann et al. |
| 2016/0182342 A1 | 6/2016 | Singaravelu et al. |
| 2016/0239330 A1 | 8/2016 | Bride et al. |
| 2016/0285913 A1 | 9/2016 | Itskin et al. |
| 2016/0294858 A1 | 10/2016 | Woolward et al. |
| 2016/0306648 A1 | 10/2016 | Deguillard et al. |
| 2017/0005986 A1 | 1/2017 | Bansal et al. |
| 2017/0024334 A1 | 1/2017 | Bergsten et al. |
| 2017/0075845 A1 | 3/2017 | Kopparthi |
| 2017/0093623 A1 | 3/2017 | Zheng |
| 2017/0099532 A1 | 4/2017 | Kakande |
| 2017/0104790 A1 | 4/2017 | Meyers et al. |
| 2017/0118173 A1 | 4/2017 | Arramreddy et al. |
| 2017/0134433 A1 | 5/2017 | Hugenbruch et al. |
| 2017/0161090 A1 | 6/2017 | Kodama |
| 2017/0161189 A1 | 6/2017 | Gertner |
| 2017/0180273 A1 | 6/2017 | Daly et al. |
| 2017/0180414 A1 | 6/2017 | Andrews et al. |
| 2017/0187679 A1 | 6/2017 | Basak et al. |
| 2017/0195454 A1 | 7/2017 | Shieh |
| 2017/0208100 A1 | 7/2017 | Lian et al. |
| 2017/0214549 A1 | 7/2017 | Yoshino et al. |
| 2017/0244671 A1 | 8/2017 | Kamalakantha et al. |
| 2017/0244673 A1 | 8/2017 | Han |
| 2017/0244674 A1 | 8/2017 | Han |
| 2017/0264622 A1 | 9/2017 | Cooper et al. |
| 2017/0295033 A1 | 10/2017 | Cherian et al. |
| 2018/0024775 A1 | 1/2018 | Miller |
| 2018/0024964 A1 | 1/2018 | Mao et al. |
| 2018/0032249 A1 | 2/2018 | Makhervaks et al. |
| 2018/0088978 A1 | 3/2018 | Li et al. |
| 2018/0095872 A1 | 4/2018 | Dreier et al. |
| 2018/0097778 A1 | 4/2018 | Jain et al. |
| 2018/0109471 A1 | 4/2018 | Chang et al. |
| 2018/0152540 A1 | 5/2018 | Niell et al. |
| 2018/0260125 A1 | 9/2018 | Botes et al. |
| 2018/0262599 A1 | 9/2018 | Firestone |
| 2018/0278684 A1 | 9/2018 | Rashid et al. |
| 2018/0309641 A1 | 10/2018 | Wang et al. |
| 2018/0309718 A1 | 10/2018 | Zuo |
| 2018/0329743 A1 | 11/2018 | Pope et al. |
| 2018/0331976 A1 | 11/2018 | Pope et al. |
| 2018/0336346 A1 | 11/2018 | Guenther |
| 2018/0337991 A1 | 11/2018 | Kumar et al. |
| 2018/0349037 A1 | 12/2018 | Zhao et al. |
| 2018/0359215 A1 | 12/2018 | Khare et al. |
| 2019/0042506 A1 | 2/2019 | Devey et al. |
| 2019/0044809 A1 | 2/2019 | Willis et al. |
| 2019/0044866 A1 | 2/2019 | Chilikin et al. |
| 2019/0075063 A1 | 3/2019 | McDonnell et al. |
| 2019/0132296 A1 | 5/2019 | Jiang et al. |
| 2019/0158396 A1 | 5/2019 | Yu et al. |
| 2019/0173689 A1 | 6/2019 | Cherian et al. |
| 2019/0200105 A1 | 6/2019 | Cheng et al. |
| 2019/0235909 A1 | 8/2019 | Jin et al. |
| 2019/0278675 A1 | 9/2019 | Bolkhovitin et al. |
| 2019/0280980 A1 | 9/2019 | Hyoudou |
| 2019/0286373 A1 | 9/2019 | Karumbunathan et al. |
| 2019/0306083 A1 | 10/2019 | Shih et al. |
| 2020/0021532 A1 | 1/2020 | Borikar et al. |
| 2020/0028800 A1 | 1/2020 | Strathman et al. |
| 2020/0042234 A1 | 2/2020 | Krasner et al. |
| 2020/0042389 A1 | 2/2020 | Kulkarni et al. |
| 2020/0042412 A1 | 2/2020 | Kulkarni et al. |
| 2020/0133909 A1 | 4/2020 | Hefty et al. |
| 2020/0136996 A1 | 4/2020 | Li et al. |
| 2020/0213227 A1 | 7/2020 | Pianigiani et al. |
| 2020/0259731 A1 | 8/2020 | Sivaraman et al. |
| 2020/0278892 A1 | 9/2020 | Nainar et al. |
| 2020/0278893 A1 | 9/2020 | Niell et al. |
| 2020/0314011 A1 | 10/2020 | Deval et al. |
| 2020/0319812 A1 | 10/2020 | He et al. |
| 2020/0328192 A1 | 10/2020 | Zaman et al. |
| 2020/0382329 A1 | 12/2020 | Yuan |

(56) References Cited

U.S. PATENT DOCUMENTS

| | | |
|---|---|---|
| 2020/0401320 A1 | 12/2020 | Pyati et al. |
| 2020/0412659 A1 | 12/2020 | Ilitzky et al. |
| 2021/0019270 A1 | 1/2021 | Li et al. |
| 2021/0026670 A1 | 1/2021 | Krivenok et al. |
| 2021/0058342 A1 | 2/2021 | McBrearty |
| 2021/0176212 A1 | 6/2021 | Han |
| 2021/0226846 A1 | 7/2021 | Ballard et al. |
| 2021/0232528 A1 | 7/2021 | Kutch et al. |
| 2021/0266259 A1 | 8/2021 | Renner, III et al. |
| 2021/0273911 A1 | 9/2021 | Jain et al. |
| 2021/0314232 A1 | 10/2021 | Nainar et al. |
| 2021/0326270 A1* | 10/2021 | Zou .................. G06F 3/0604 |
| 2021/0357242 A1 | 11/2021 | Ballard et al. |
| 2021/0377166 A1 | 12/2021 | Brar et al. |
| 2021/0377188 A1 | 12/2021 | Ghag et al. |
| 2021/0392017 A1 | 12/2021 | Cherian et al. |
| 2021/0409317 A1 | 12/2021 | Seshan et al. |
| 2022/0027147 A1 | 1/2022 | Maddukuri et al. |
| 2022/0043572 A1 | 2/2022 | Said et al. |
| 2022/0100432 A1 | 3/2022 | Kim et al. |
| 2022/0100491 A1 | 3/2022 | Voltz et al. |
| 2022/0100542 A1 | 3/2022 | Voltz |
| 2022/0100544 A1 | 3/2022 | Voltz |
| 2022/0100545 A1 | 3/2022 | Cherian et al. |
| 2022/0100546 A1 | 3/2022 | Cherian et al. |
| 2022/0103478 A1 | 3/2022 | Ang et al. |
| 2022/0103487 A1 | 3/2022 | Ang et al. |
| 2022/0103488 A1 | 3/2022 | Wang et al. |
| 2022/0103490 A1 | 3/2022 | Kim et al. |
| 2022/0103629 A1 | 3/2022 | Cherian et al. |
| 2022/0150055 A1 | 5/2022 | Cui et al. |
| 2022/0164451 A1 | 5/2022 | Bagwell |
| 2022/0197681 A1 | 6/2022 | Rajagopal |
| 2022/0206908 A1 | 6/2022 | Brar et al. |
| 2022/0206962 A1 | 6/2022 | Kim et al. |
| 2022/0206964 A1 | 6/2022 | Kim et al. |
| 2022/0210229 A1 | 6/2022 | Maddukuri et al. |
| 2022/0217085 A1* | 7/2022 | Sankar .................. H04L 49/254 |
| 2022/0231968 A1 | 7/2022 | Rajagopal |
| 2022/0261178 A1* | 8/2022 | He .................. G06F 12/1027 |
| 2022/0272039 A1 | 8/2022 | Cardona et al. |
| 2022/0283964 A1* | 9/2022 | Burstein .............. G06F 13/387 |
| 2022/0335563 A1 | 10/2022 | Elzur |
| 2022/0398215 A1* | 12/2022 | Norrie .................. H04L 9/3213 |
| 2023/0004508 A1 | 1/2023 | Liu et al. |
| 2023/0195488 A1 | 6/2023 | Ang et al. |
| 2023/0195675 A1 | 6/2023 | Ang et al. |
| 2023/0198833 A1 | 6/2023 | Ang et al. |
| 2023/0333996 A1* | 10/2023 | Glimcher .............. G06F 13/105 |

FOREIGN PATENT DOCUMENTS

| | | |
|---|---|---|
| CN | 101258725 A | 9/2008 |
| CN | 101540826 A | 9/2009 |
| DE | 102018004046 A1 | 11/2018 |
| EP | 1482711 A2 | 12/2004 |
| EP | 2748750 A1 | 7/2014 |
| EP | 3598291 A1 | 1/2020 |
| EP | 4160424 A2 | 4/2023 |
| NO | 2022066268 A1 | 3/2022 |
| TW | 202107297 A | 2/2021 |
| WO | 2005099201 A2 | 10/2005 |
| WO | 2007036372 A1 | 4/2007 |
| WO | 2008095010 A1 | 8/2008 |
| WO | 2010008984 A2 | 1/2010 |
| WO | 2013074828 A1 | 5/2013 |
| WO | 2015187201 A1 | 12/2015 |
| WO | 2016003489 A1 | 1/2016 |
| WO | 2020027913 A1 | 2/2020 |
| WO | 2020211071 A1 | 10/2020 |
| WO | 2021030020 A1 | 2/2021 |
| WO | 2022066267 A1 | 3/2022 |
| WO | 2022066270 A1 | 3/2022 |
| WO | 2022066271 A1 | 3/2022 |
| WO | 2022066531 A1 | 3/2022 |
| WO | 2023121720 A1 | 6/2023 |

OTHER PUBLICATIONS

Angeles, Sara, "Cloud vs. Data Center: What's the difference?" Nov. 23, 2018, 1 page, retrieved from https://www.businessnewsdaily.com/4982-cloud-vs-data-center.html.

Author Unknown, "Middlebox," Wikipedia, Nov. 19, 2019, 1 page, Wikipedia.com.

Doyle, Lee, "An Introduction to smart NICs and their Benefits," Jul. 2019, 2 pages, retrieved from https://www.techtarget.com/searchnetworking/tip/An-introduction-to-smart-NICs-and-ther-benefits.

Author Unknown, "Cisco Identity-Based Firewall Security," Month Unknown 2011, 2 pages, CISCO Systems, Inc.

Author Unknown, "Hypervisor," Aug. 13, 2020, 1 page, VMware.com.

Author Unknown, "Transparent," Free On-Line Dictionary of Computing (FOLDOC), Jun. 6, 1996, 1 page, retrieved from http://foldoc.org/transparent.

Author Unknown, "AppLogic Features," Jul. 2007, 2 pages, 3TERA, Inc.

Author Unknown, "Enabling Service Chaining on Cisco Nexus 1000V Series," Month Unknown, 2012, 25 pages, CISCO.

Author Unknown, "Next-Generation Firewalls," Month Unknown 2013, 1 page, Palo Alto Networks.

Basak, Debashis, et al., "Virtualizing Networking and Security in the Cloud," Month Unknown 2010, 9 pages, VMware, Inc., Palo Alto, CA.

Casado, Martin, et al., "SANE: A Protection Architecture for Enterprise Networks," Proceedings of the 15th USENIX Security Symposium, Jul. 31-Aug. 4, 2006, 15 pages, USENIX, Vancouver, Canada.

Dixon, Colin, et al., "An End to the Middle," Proceedings of the 12th Conference on Hot Topics in Operating Systems, May 2009, 5 pages, USENIX Association, Berkeley, CA, USA.

Dumitriu, Dan Mihai, et al., (U.S. Appl. No. 61/514,990), filed Aug. 4, 2011, 31 pages.

Guichard, J., et al., "Network Service Chaining Problem Statement," Network Working Group, Jun. 13, 2013, 14 pages, Cisco Systems, Inc.

Ioannidis, Sotiris, et al., "Implementing a Distributed Firewall," CCS '00, Month Unknown 2000, 10 pages, ACM, Athens, Greece.

Joseph, Dilip Anthony, et al., "A Policy-aware Switching Layer for Data Centers," Jun. 24, 2008, 26 pages, Electrical Engineering and Computer Sciences, University of California, Berkeley, CA, USA.

Li, Junnan, et al., "DrawerPipe: A Reconfigurable Pipeline for Network Processing on FGPA-Based SmartNIC," Electronics 2020, Dec. 10, 2019, 24 pages, retrieved from https://www.mdpi.com/2079-9292/9/1/59.

Litvak, Michail, "Linux—IP-RULE(8): Routing Policy Database Management," Apr. 10, 2014, 5 pages, retrieved from https://man7.org/linux/man-pages/man8/ip-rule.8.html.

Mohammadkhan, Ali, et al., "P4NFV: P4 Enabled NFV Systems with SmartNICs," 2019 IEEE Conference on Network Function Virtualization and Software Defined Networks (NFV-SDN), Nov. 12-14, 2019, 7 pages, IEEE, Dallas, TX, USA.

Non-Published Commonly Owned Related International Patent Application PCT/US2023/022193 with similar specification, filed May 14, 2023, 29 pages, VMware, Inc.

Non-Published Commonly Owned U.S. Appl. No. 18/196,844, filed May 12, 2023, 41 pages, Nicira, Inc.

Non-Published Commonly Owned U.S. Appl. No. 18/226,775, filed Jul. 27, 2023, 63 pages, Nicira, Inc.

Olds, Dan, "OS Virtualization vs. Hypervisor: Why You Should Offer Both," Oct. 19, 2008, 3 pages, techtarget.com.

Pagiamtzis, Kostas, et al., "Content-Addressable Memory (CAM) Circuits and Architectures: A Tutorial and Survey," IEEE Journal of Solid-State Circuits, Mar. 2006, 16 pages, vol. 41, No. 3.

(56) References Cited

OTHER PUBLICATIONS

PCT International Search Report and Written Opinion of Commonly Owned International Patent Application PCT/US2023/022193, mailing date Aug. 4, 2023, 15 pages, International Searching Authority (EPO).
Scarfone, Karen, et al., "Guidelines on Firewalls and Firewall Policy: Recommendations of the National Institute of Standards and Technology," Special Publication 800-41, Revision 1, Sep. 2009, 48 pages, NIST, U.S. Department of Commerce.
Sekar, Vyas, et al., "Design and Implementation of a Consolidated Middlebox Architecture," 9th USENIX Symposium on Networked Systems Design and Implementation, Apr. 25-27, 2012, 14 pages, USENIX, San Jose, CA, USA.
Sherry, Justine, et al., "Making Middleboxes Someone Else's Problem: Network Processing as a Cloud Service," In Proc. of SIGCOMM '12, Aug. 13-17, 2012, 12 pages, Helsinki, Finland.
Stojanovski, Nenad, et al., "Analysis of Identity Based Firewall Systems," Jun. 2010, 9 pages.
Stojanovski, Nenad, et al., "Architecture of A Identity Based Firewall System," Jul. 2011, 9 pages.
Anwer, Muhammad Bilal, et al., "Building a Fast, Virtualized Data Plane with Programmable Hardware," Aug. 17, 2009, 8 pages, VISA'09, ACM, Barcelona, Spain.
Author Unknown, "8.6 Receive-Side Scaling (RSS)," Month Unknown 2020, 2 pages, Red Hat, Inc.
Author Unknown, "An Introduction to SmartNICs" The Next Platform, Mar. 4, 2019, 4 pages, retrieved from https://www.nextplatform.com/2019/03/04/an-introduction-to-smartnics/.
Author Unknown, "In-Hardware Storage Virtualization—NVMe SNAP™ Revolutionizes Data Center Storage: Composable Storage Made Simple," Month Unknown 2019, 3 pages, Mellanox Technologies, Sunnyvale, CA, USA.
Author Unknown, "Package Manager," Wikipedia, Sep. 8, 2020, 10 pages.
Author Unknown, "VMDK", Wikipedia, May 17, 2020, 3 pages, retrieved from https://en.wikipedia.org/w/index.php?title=VMDK&oldid=957225521.
Author Unknown, "vSAN Planning and Deployment" Update 3, Aug. 20, 2019, 85 pages, VMware, Inc., Palo Alto, CA, USA.
Author Unknown, "vSphere Managed Inventory Objects," Aug. 3, 2020, 3 pages, retrieved from https://docs.vmware.com/en/VMware-vSphere/6.7/com.vmware.vsphere.vcenterhost.doc/GUID-4D4B3DF2-D033-4782-A030-3C3600DE5A7F.html, VMware, Inc.
Author Unknown, "What is End-to-End Encryption and How does it Work?," Mar. 7, 2018, 4 pages, Proton Technologies AG, Geneva, Switzerland.
Author Unknown, "Network Functions Virtualisation; Infrastructure Architecture; Architecture of the Hypervisor Domain," Draft ETSI GS NFV-INF 004 V0.3.1, May 28, 2014, 50 pages, France.
Grant, Stewart, et al., "SmartNIC Performance Isolation with FairNIC: Programmable Networking for the Cloud," SIGCOMM '20, Aug. 10-14, 2020, 13 pages, ACM, Virtual Event, USA.
Harris, Jim, "Accelerating NVME-oF* for VMs with the Storage Performance Development Kit," Flash Memory Summit, Aug. 2017, 18 pages, Intel Corporation, Santa Clara, CA.
Herbert, Tom, et al., "Scaling in the Linux Networking Stack," Jun. 2, 2020, retrieved from https://01.org/inuxgraphics/gfx-docs/drm/networking/scaling.html.
Koponen, Teemu, et al., "Network Virtualization in Multi-tenant Datacenters," Technical Report TR-2013-001E, Aug. 2013, 22 pages, VMware, Inc., Palo Alto, CA, USA.
Le Vasseur, Joshua, et al., "Standardized but Flexible I/O for Self-Virtualizing Devices," Month Unknown 2008, 7 pages.
Liu, Ming, et al., "Offloading Distributed Applications onto SmartNICs using iPipe, " SIGCOMM '19, Aug. 19-23, 2019, 16 pages, ACM, Beijing, China.
Non-Published Commonly Owned U.S. Appl. No. 17/560,142, filed Dec. 22, 2021, 60 pages, VMware, Inc.
Non-Published Commonly Owned U.S. Appl. No. 17/560,148, filed Dec. 22, 2021, 59 pages, VMware, Inc.
Non-Published Commonly Owned U.S. Appl. No. 17/560,153, filed Dec. 22, 2021, 59 pages, VMware, Inc.
Perlroth, Nicole, "What is End-to-End Encryption? Another Bull's-Eye on Big Tech," The New York Times, Nov. 19, 2019, 4 pages, retrieved from https://nytimes.com/2019/11/19/technology/end-to-end-encryption.html.
Peterson, Larry L., et al., "OS Support for General-Purpose Routers," Month Unknown 1999, 6 pages, Department of Computer Science, Princeton University.
Pettit, Justin, et al., "Virtual Switching in an Era of Advanced Edges," In Proc. 2nd Workshop on Data Center-Converged and Virtual Ethernet Switching (DCCAVES), Sep. 2010, 7 pages, vol. 22. ITC.
Spalink, Tammo, et al., "Building a Robust Software-Based Router Using Network Processors," Month Unknown 2001, 14 pages, ACM, Banff, Canada.
Stringer, Joe, et al., "OVS Hardware Offloads Discussion Panel," Nov. 7, 2016, 37 pages, retrieved from http://openvswitch.org/support/ovscon2016/7/1450-stringer.pdf.
Suarez, Julio, "Reduce TCO with Arm Based SmartNICs," Nov. 14, 2019, 12 pages, retrieved from https://community.arm.com/arm-community-blogs/b/architectures-and-processors-blog/posts/reduce-tco-with-arm-based-smartnics.
Turner, Jon, et al., "Supercharging PlanetLab—High Performance, Multi-Application Overlay Network Platform," SIGCOMM-07, Aug. 27-31, 2007, 12 pages, ACM, Koyoto, Japan.

\* cited by examiner

LOGICAL MEMORY ADDRESSING BY SMART NIC ACROSS MULTIPLE DEVICES

BACKGROUND

Especially in the datacenter context, programmable smart network interface controllers (NICs) are becoming more commonplace. These smart NICs typically include a central processing unit (CPU), possibly in addition to one or more application-specific integrated circuits (ASICs) or field-programmable gate arrays (FPGAs). These ASICs (or FPGAs) can be designed for packet processing as well as other uses. However, the inclusion of the CPU also allows for more configurability of the smart NICs, thereby enabling the offloading of some tasks from software of a host computer.

BRIEF SUMMARY

Some embodiments provide a network interface controller (NIC) that translates logical memory addresses into physical (or virtual) memory addresses for accessing multiple devices connected to a computer. That is, a logical memory is defined that spans the NIC as well as other devices. The NIC, in some embodiments, is a smart NIC that includes at least a configurable processor for more than simply performing basic I/O data message handling. The NIC is configured to receive a logical memory address (e.g., referencing a location for payload data for a data message to be sent via the NIC), translate the logical memory address into a memory address for accessing a particular one of the devices, and reading the data from the device. This translation capability of the NIC enables more efficient data message processing on the computer, in some embodiments.

In some embodiments, the multiple devices across which the logical memory accessible to the NIC spans include at least (i) the physical memory of the NIC itself and (ii) the I/O virtual memory of the computer. In addition, the logical memory may span other devices connected to the computer, such as one or more non-volatile memory express (NVMe) devices (e.g., connected via a peripheral component interconnect express (PCIe)), physical or virtual memory associated with one or more graphics processing units (GPUs) of the computer, etc.

In some embodiments, the NIC receives the logical memory address from a network stack (e.g., a TCP/IP stack) of the host computer in reference to a data message the NIC is responsible for sending out to a network (i.e., the network for which the NIC is the interface of the computer). The NIC may receive from the network stack (i) a data message header and (ii) a logical memory address at which the payload for the data message is stored. The NIC can then translate the logical memory address, read the payload data from the memory of the appropriate device, construct the data message using the provided header and the payload data, and send the data message out of its physical interface. This avoids the need for the payload data to be copied to the I/O virtual memory associated with the host computer network stack, as the NIC is capable of reading the payload data directly.

For instance, for data messages received by the NIC at a computer that performs middlebox processing (e.g., load balancing, firewall processing, network address translation (NAT), etc.) on these data messages without requiring the payload data for processing, the NIC can extract the data message headers (e.g., the L2-L4 headers) and send only these headers to the network stack. The NIC stores the payload in its physical memory while providing the network stack (along with the headers) a logical address that translates to the location in NIC physical memory of the payload. After the network stack and/or additional processes (e.g., various middlebox processes operating on the computer operating system and/or in virtualized data compute nodes) are completed with their tasks, the network stack provides headers for a new data message (which may be the same headers as the original data message or modified headers based on the processing) to the NIC along with the logical memory address for the payload. Thus, both host computer memory and the resources for copying the payload data between the NIC and the host computer memory are saved.

Another example involves sending a data file that is stored at the computer (e.g., on an NVMe device) without the need to copy the file from its storage location to I/O virtual memory and then to the NIC. Instead, the network stack provides to the NIC (for each data message needed to send the file) the headers and the logical memory address of the payload, allowing the NIC to retrieve the payload from the appropriate memory location. Thus, for a large file, the network stack provides the NIC with the same header for each of numerous data messages, each time with a new (typically contiguous to the previous) logical memory address.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description, and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments provide a network interface controller (NIC) that translates logical memory addresses into physical (or virtual) memory addresses for accessing multiple devices connected to a computer. That is, a logical memory is defined that spans the NIC as well as other devices. The NIC, in some embodiments, is a smart NIC that includes at least a configurable processor for more than simply performing basic I/O data message handling. The NIC is configured to receive a logical memory address (e.g., referencing a location for payload data for a data message to be sent via the NIC), translate the logical memory address into a memory address for accessing a particular one of the devices, and reading the data from the device. This translation capability of the NIC enables more efficient data message processing on the computer, in some embodiments.

In some embodiments, the multiple devices across which the logical memory accessible to the NIC spans include at least (i) the physical memory of the NIC itself and (ii) the I/O virtual memory of the computer. In addition, the logical memory may span other devices connected to the computer, such as one or more non-volatile memory express (NVMe) devices (e.g., connected via a peripheral component interconnect express (PCIe)), physical or virtual memory associated with one or more graphics processing units (GPUs) of the computer, etc.

The smart NIC, in some embodiments, is a configurable network interface controller that includes a general-purpose CPU (e.g., an ARM or x86 processor), which is typically low-power compared to the processor of the computer for which the smart NIC acts as the network interface, in addition to one or more application-specific circuits (e.g., data message processing circuits). In other embodiments, the smart NIC is a NIC with a low-power processor that can be configured to perform logical memory address translation but does not include a full general-purpose CPU with its own operating system.

Figure 1:
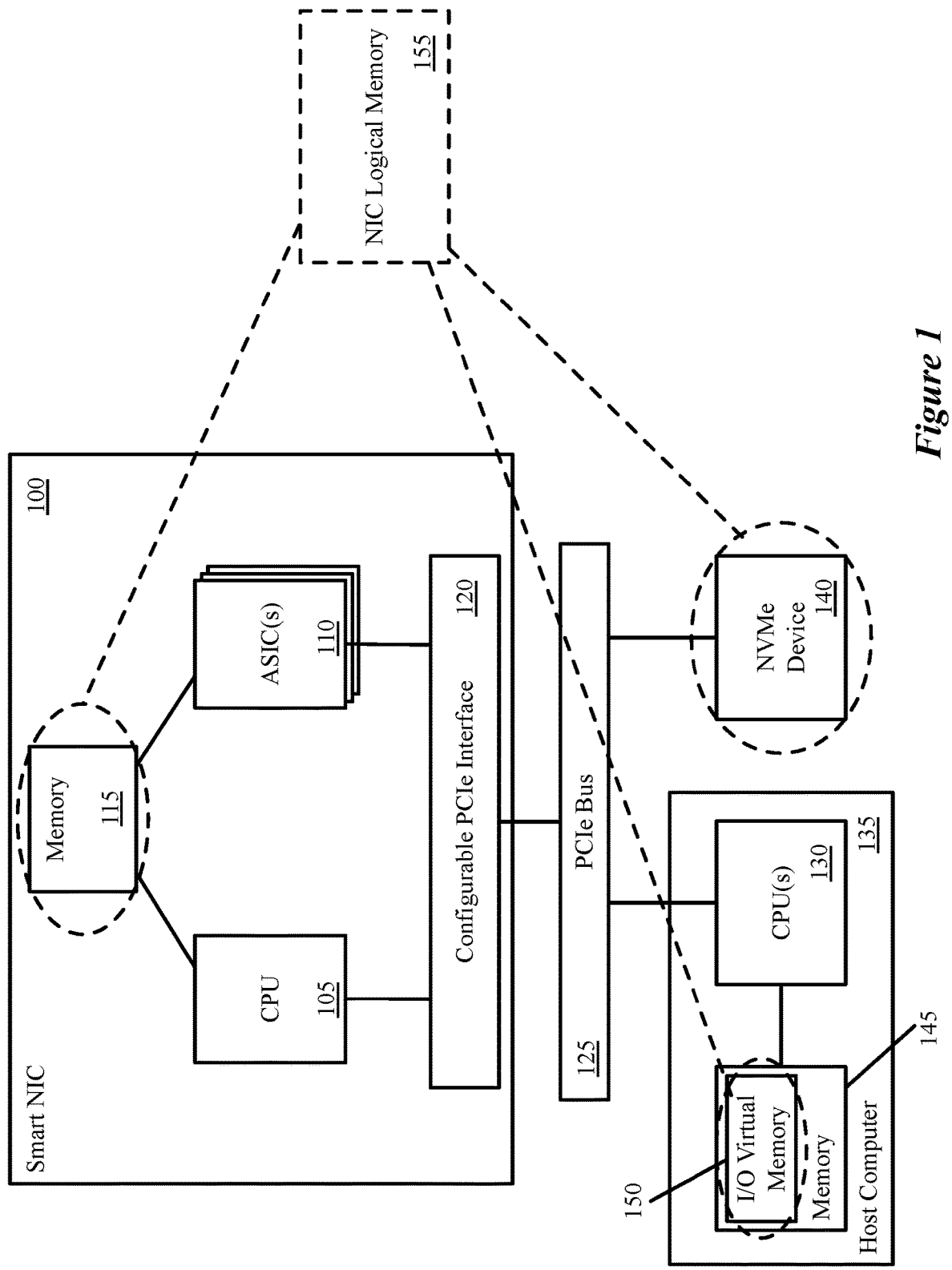
FIG. 1 conceptually illustrates the hardware of a smart NIC of some embodiments that can be configured to translate logical memory addresses into physical or virtual memory addresses for a particular device in order to avoid unneeded copying of data.

FIG. 1 conceptually illustrates the hardware of a smart NIC 100 of some embodiments that can be configured to translate logical memory addresses into physical or virtual memory addresses for a particular device in order to avoid unneeded copying of data (e.g., when sending data messages). As shown, the smart NIC 100 includes its own general-purpose (e.g., x86 or ARM) CPU 105, a set of application-specific integrated circuit (ASICs) 110, memory 115, and a configurable PCIe interface 120. The ASICs 110, in some embodiments, include at least one I/O ASIC that handles the processing of data messages forwarded to and from the computer (e.g., performing forwarding according to a set of forwarding entries). In some embodiments, these ASICs 110 are at least partly controlled by the CPU 105. In some embodiments, either in addition to or as an alternative to the ASICs, the smart NIC may include a set of configurable field-programmable gate arrays (FPGAs). It should be noted that, in some embodiments, the CPU is a lightweight processor (e.g., not an ARM or x86 processor) that only functions to perform logical memory address translation. In other embodiments, the NIC 100 does not include a general-purpose processor at all and instead an ASIC or FPGA is configured to perform the logical memory address translation.

The configurable PCIe interface 120 enables connection of the smart NIC 100 to the other physical components of a computer system via a PCIe bus 125 of the computer system. Via this configurable PCIe interface, the smart NIC 100 can present itself to the computer system as a multitude of devices, including a data message processing NIC, a hard disk (using non-volatile memory express (NVMe) over PCIe), or other types of devices. As shown, also connected to the PCIe bus is (i) a set of CPU(s) 130 of a host computer 135 and one or more NVMe devices 140.

The host computer 135 includes at least a set of CPUs 130 (e.g., a single processor, a multi-core processor, etc.) and a memory (e.g., one or more random access memories) 145. In different embodiments, the host computer 135 may be a bare metal (i.e., non-virtualized) computing device or may operate a set of virtualized data compute nodes (e.g., containers, virtual machines, etc.). The host computer CPU 130 executes a network stack as well as various other processes (e.g., operating system, hypervisor, applications, etc.), making use of the memory 145. A portion of the memory 145 is allocated to I/O virtual memory 150 for use by the network stack executing on the host computer CPU 130.

The NVMe devices 140 connect to the host computer 135 as well as the smart NIC 100 via the PCIe bus 125. The NVMe devices can be used as storage (e.g., disk storage) for the system. In some embodiments, the NIC 100 is configured to access memory spanning its own memory 115, any NVMe devices 140, and the I/O virtual memory 150. These different memories are combined to form a NIC logical memory 155, with the NIC able to translate between logical memory addresses and the physical (or virtual) memory addresses of these different memory components. In some embodiments, the logical memory 155 can include additional physical (or virtual) memory devices, such as the memory associated with one or more graphics processing units (GPUs) of the host computer 135.

Figure 2:
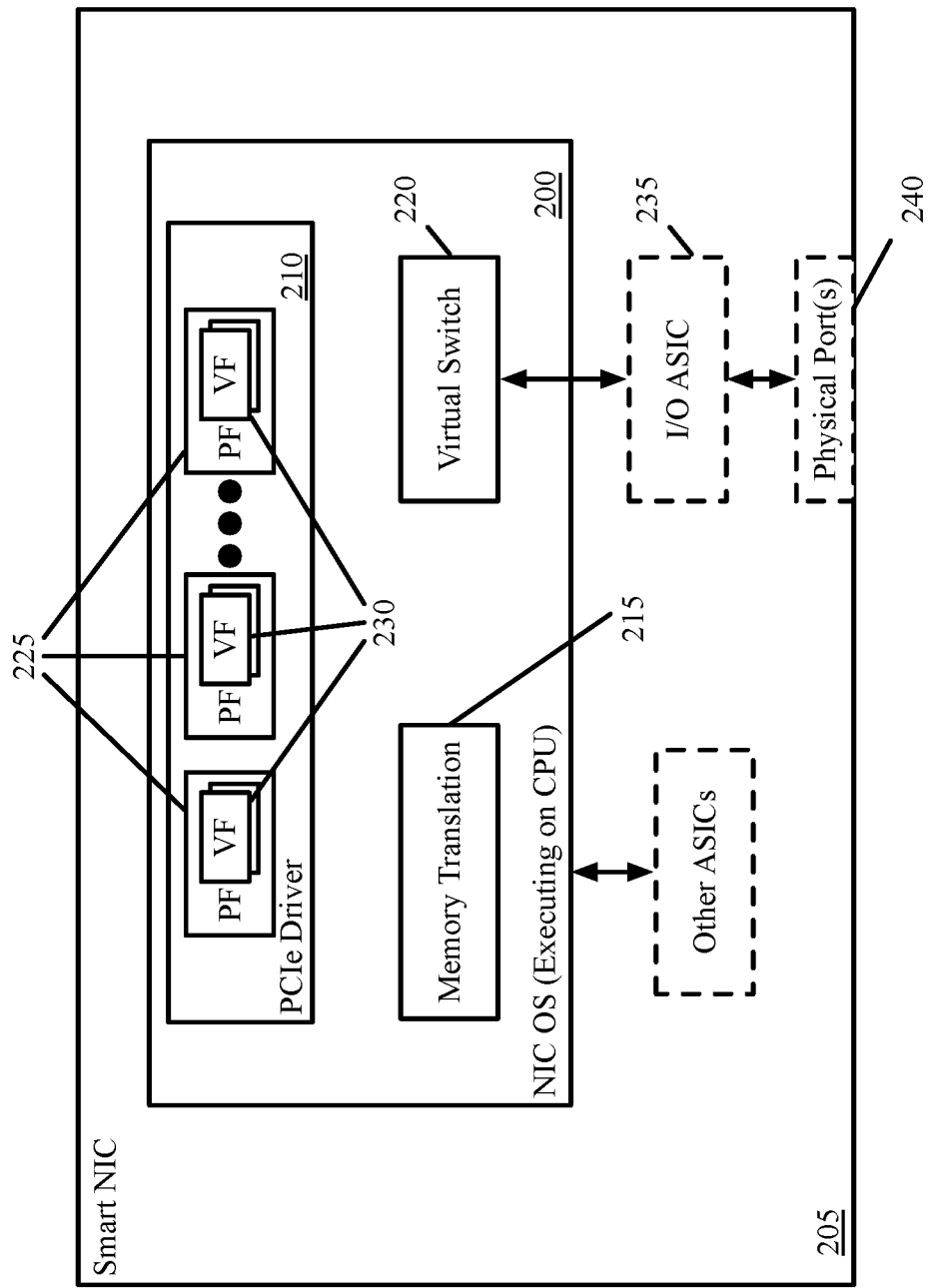
FIG. 2 conceptually illustrates the NIC OS of a smart NIC of some embodiments.

In some embodiments, the CPU 105 of the smart NIC executes a NIC operating system (OS) that controls the ASICs 110 and can perform other operations as well, including logical memory address translation. FIG. 2 conceptually illustrates the NIC OS 200 of a smart NIC 205 of some embodiments. The NIC OS 200 is executed, in some embodiments, by the CPU of the smart NIC (e.g., CPU 105). This NIC OS 200 includes a PCIe driver 210, a virtual switch 220, and other functions 215.

The PCIe driver 210 includes multiple physical functions 225, each of which is capable of instantiating multiple virtual functions 230. These different physical functions 225 enable the smart NIC to present as multiple different types of devices to the computer system to which it attaches via its PCIe bus. For instance, the smart NIC can present itself as a network adapter (for processing data messages to and from the computer system) as well as an NVMe disk in some embodiments.

The NIC OS 200 of some embodiments is capable of executing a virtualization program (similar to a hypervisor) that enables sharing resources (e.g., memory, CPU resources) of the smart NIC among multiple machines (e.g., VMs) if those VMs execute on the computer. The virtualization program can provide compute virtualization services and/or network virtualization services similar to a managed hypervisor in some embodiments. These network virtualization services, in some embodiments, include segregating data messages into different private (e.g., overlay) networks that are defined over the physical network (shared between the private networks), forwarding the data messages for these private networks (e.g., performing switching and/or routing operations), and/or performing middlebox services for the private networks.

To implement these network virtualization services, the NIC OS 200 of some embodiments executes the virtual switch 220. The virtual switch 220 enables the smart NIC to perform software-defined networking and provide the I/O ASIC 235 of the smart NIC 205 with a set of flow entries (e.g., the cache entries described herein) so that the I/O ASIC 235 can perform flow processing offload (FPO) for the computer system in some embodiments. The I/O ASIC 235, in some embodiments, receives data messages from the network and transmits data messages to the network via one or more physical network ports 240.

The memory translation function 215 executed by the NIC operating system 200 of some embodiments translates between logical memory addresses and physical or virtual memory addresses of multiple devices, including the physical NIC memory, I/O virtual memory associated with the computer network stack, one or more NVMe devices, etc. The NIC OS 200 can also include various other operations, including operations not directly related to data message processing (e.g., operations for a machine-learning system).

In other embodiments, as indicated above, the NIC does not run a full NIC OS. Instead, either a lightweight CPU (e.g., a non-x86/ARM processor) or an ASIC or FPGA is configured to perform the logical memory address translation. In this case, the NIC is also capable of performing typical I/O data message processing functions.

Figure 3:
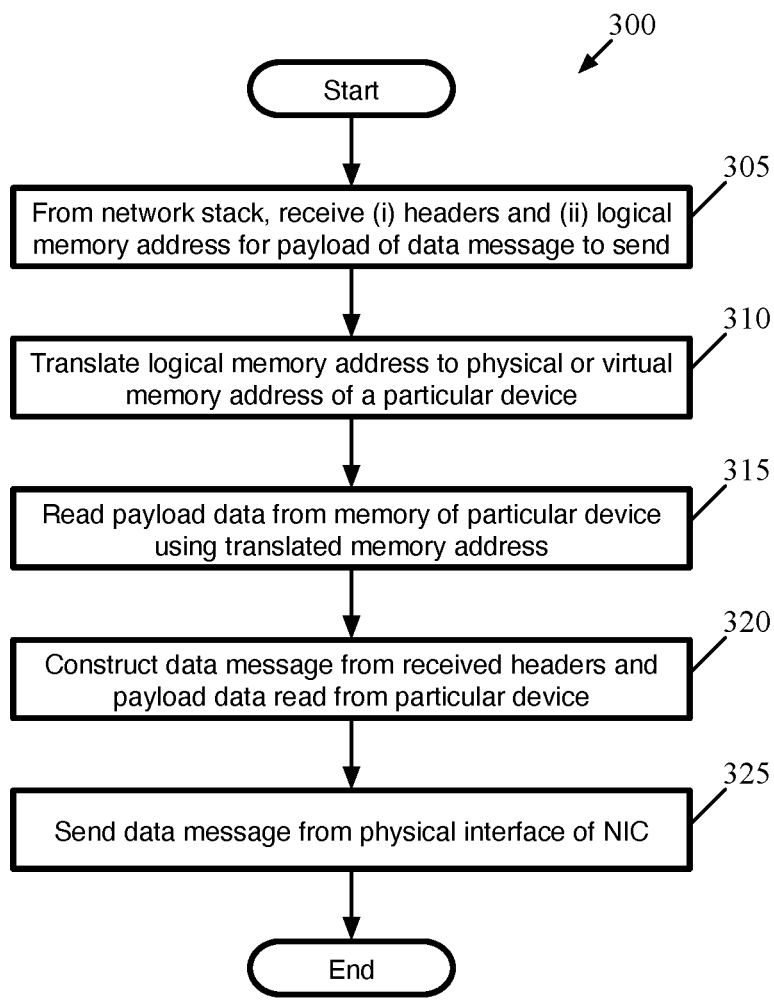
FIG. 3 conceptually illustrates a process of some embodiments for translating a logical memory address into a physical or virtual memory address of a particular device.

FIG. 3 conceptually illustrates a process 300 of some embodiments for translating a logical memory address into a physical or virtual memory address of a particular device. The process 300 is performed by a smart NIC, in some embodiments, in the context of sending a data message from the host computer to a network for which the smart NIC is the interface. As described below in further detail, the data message being sent by the smart NIC could be part of a file transfer, a data message previously received at the smart NIC on which the computer performed one or more operations, or other types of data messages for other purposes. The process 300 will be described in part by reference to FIG. 4, which conceptually illustrates translation tables used by the smart NIC translation logic of some embodiments.

As shown, the process 300 begins by receiving (at 305) (i) data message headers and (ii) a logical memory address for a data message payload. In some embodiments, the headers and logical memory address are received from a network stack (e.g., a TCP/IP stack) of the host computer. The data message headers, in some embodiments, are L2-L4 headers (e.g., Ethernet, IP, and TCP or UDP headers) for a data message that the NIC is to send out to the network (i.e., the network for which the NIC is the interface of the computer).

In some embodiments, the network stack is configured to use logical memory addresses rather than referring to its I/O virtual memory. That is, some embodiments require that both the network stack on the host (that is generating the TCP segments or other data messages to be sent) as well as the NIC (that is constructing the actual data stream for these data messages and sending that data stream to the network) are both configured to recognize the logical memory addresses. The logical memory addresses may refer to memory on any of the devices spanned by the NIC logical memory, such as the NIC physical memory, the I/O virtual memory of the host computer utilized by the network stack, an NVMe device connected to the PCIe bus, etc.

Figure 4:
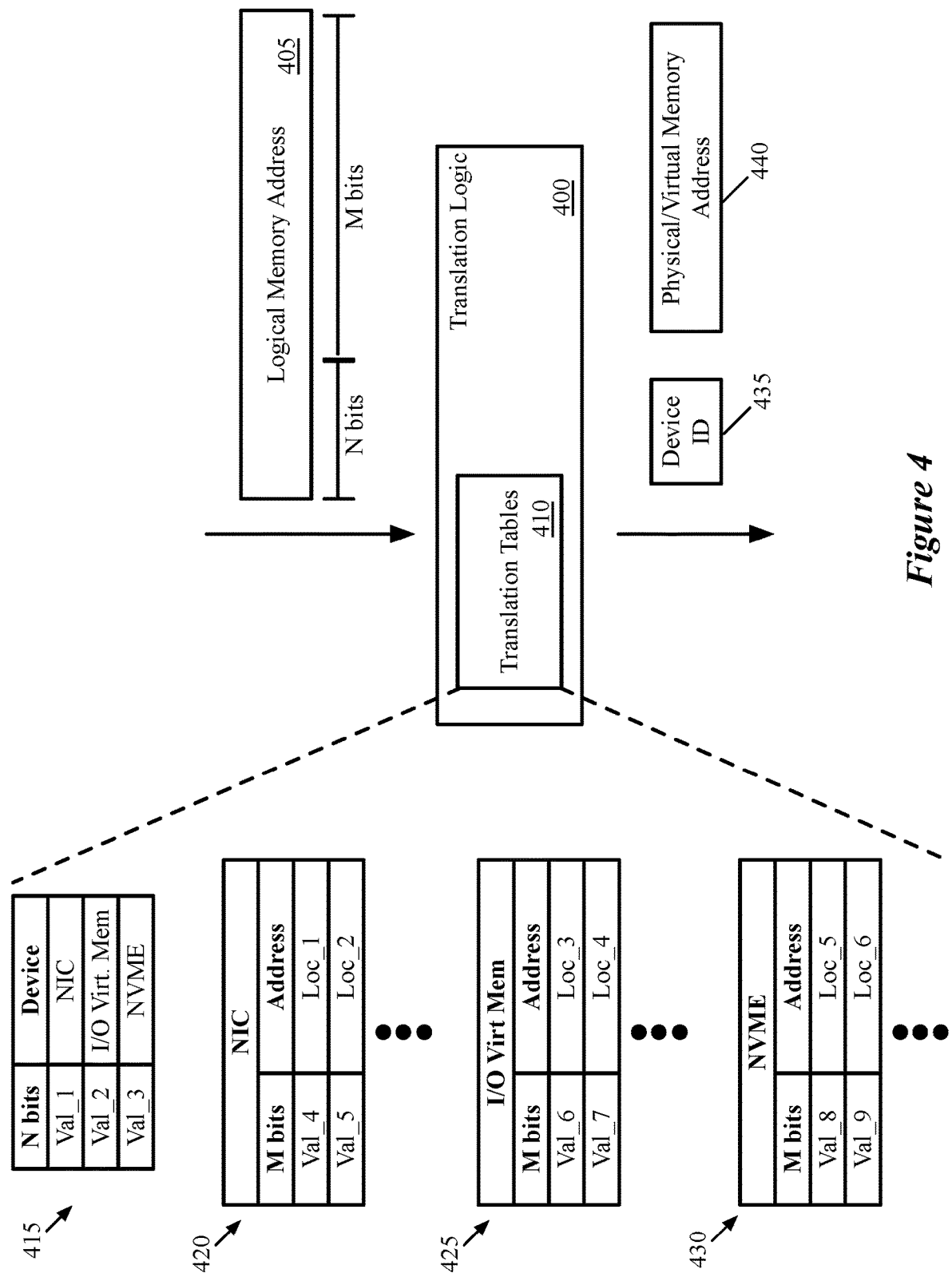
FIG. 4, which conceptually illustrates translation tables used by the smart NIC translation logic of some embodiments.

FIG. 4 conceptually illustrates an example logical memory address 405 of some embodiments that is provided to a smart NIC. As shown, the logical memory address 405 includes a first set of N bits (used to identify a device) and a second set of M bits (used to identify a physical or virtual memory location for that device). It should be understood that this is only one possible structure for a logical memory address, and that various different structures may be used so long as those logical memory addresses can be translated to an identification of a device and a memory location of that device.

Returning to FIG. 3, the process 300 translates (at 310) the logical memory address to a physical or virtual memory address of a particular device. In some embodiments, the NIC uses a set of page tables or other memory address translation tables to determine these values. As shown in FIG. 4, the translation logic 400 of the smart NIC includes a set of translation tables 410 that allow the NIC to translate the logical memory address 405. These translation tables 400, in some embodiments, includes a first table 415 that translates the first N bits of the logical memory address into a device identifier. Thus, a first value for these N bits maps to the physical memory of the NIC, a second value maps to the I/O virtual memory of the host computer, and a third value maps to an NVME device. If multiple NVME or other memory devices are connected, additional values can be used. In some embodiments, a set of three or four bits is used for the first part of the logical memory address 405 (i.e., allowing for identification of eight or sixteen different devices).

In addition, the translation tables 410 includes a separate table for each of the devices. These tables 420-430 each map the M bits to memory addresses for their respective devices. In some embodiments, these device-specific tables are not necessary, as the latter M bits of the logical memory address 405 is simply the physical or virtual memory address for the device identified by the first N bits. In other embodiments, the memory addresses are different lengths for different devices, but simple logic (e.g., removing the correct number of padded bits for each device) is used rather than a table. Still other embodiments include separate page tables for each of the devices. Irrespective of the specific format used for the translation tables 410, the result is that a logical memory address 405 is translated into a device identifier 435 and a physical or virtual memory address 440 for that device. In addition, different embodiments refer to the payload data using a starting location and ending location in memory or by using a starting location and amount (e.g., 1500 kb) of subsequent data within the memory.

Again returning to FIG. 3, with the correct device identified, the process 300 reads (at 315) the payload data for the data message from the memory of the identified device using the translated memory address. If the translated memory address refers to a location on the physical NIC, the NIC is responsible for reading this data (or using zero-copy techniques to avoid unnecessary read operations). If the translated memory address refers to a location on an NVMe device, the NIC uses the PCIe interface to retrieve data from the NVMe device. If the translated memory address refers to a location in the I/O virtual memory, in some embodiments the NIC sends a read request through the PCIe interface to the host computer CPU.

The process 300 then constructs (at 320) a data message from the received headers and the payload data read from the identified device, and sends (at 325) the data message from a physical interface of the NIC. It should be noted that the payload data may, in some cases, include its own headers. For instance, if an outer set of L2-L4 headers are provided by the host computer network stack, an inner (overlay network) set of L2-L4 headers may be part of the payload data in some cases. On the other hand, if a file is being sent, then the payload data might only include a portion of the file with all of the headers (including L2-L7 data) provided by the host computer network stack.

Figure 5:
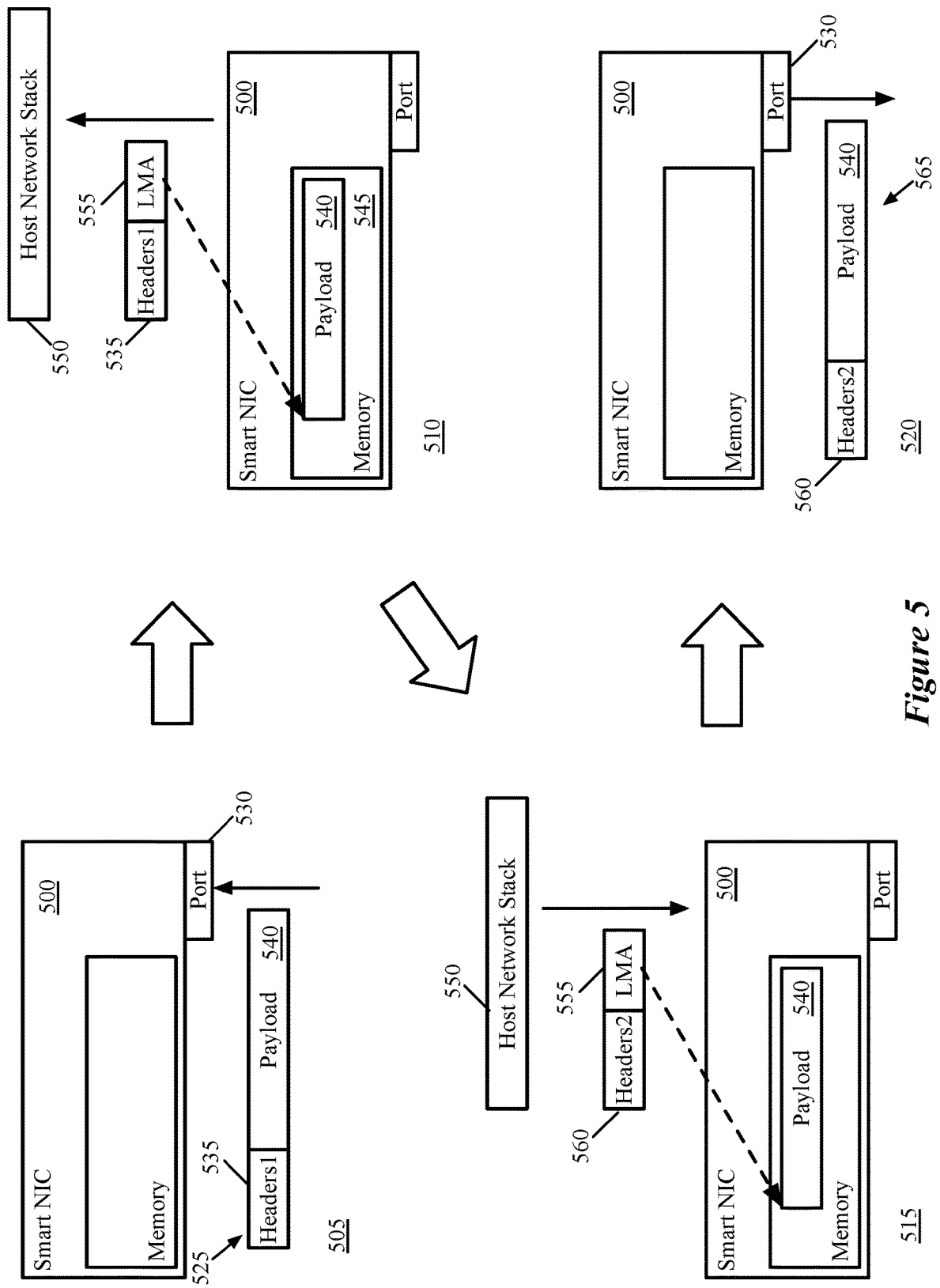
FIG. 5 conceptually illustrates an example in which the smart NIC stores payload data for a data message in its memory and only passes headers and a logical memory address to the host computer network stack.

FIG. 5 conceptually illustrates an example in which the smart NIC stores payload data for a data message in its memory and only passes headers and a logical memory address to the host computer network stack, over four stages 505-520. In this example, the host computer executes one or more data message processing services for data messages received at the smart NIC. These data message processing services (e.g., switching, routing, load balancing, firewall, network address translation, etc.) do not require payload data and instead only perform their service operations on the L2-L4 header data of the received data messages.

As shown, a smart NIC 500 receives a data message 525 from a network (not shown) via a physical port 530. The data message 525 includes a first set of headers 535 and payload data 540. It should be noted that the distinction between headers and payload is a conceptual one determined by which portion of the data message is utilized for different purposes, as the data message is received as a stream of data without a distinction between headers and payload. For instance, in some embodiments the headers 535 represent the L2-L4 (e.g., Ethernet, IP, and TCP/UDP) headers that are used by many forwarding and/or middlebox services to switch or route data messages, perform firewall or load balancing operations, etc.

In the second stage 510, the smart NIC 500 stores the payload data 540 of the data message 525 in its memory 545 at a particular location. This memory location is specified using a logical memory address such as that shown in FIG. 4 (i.e., identifying the device and the location within that device's memory). The smart NIC 500 provides, to a network stack 550 of the host computer, the headers 535 of the data message as well as the logical memory address 555 indicating the location of the payload data 540. This avoids the extra resources required to copy the payload data 540 to the host computer (e.g., via a PCIe bus).

The host computer then performs any necessary data message processing operations using the headers 535 and (assuming the data message is not dropped) determines to send the data message to its next destination. As shown in the third stage 515, the host network stack 550 provides to the smart NIC (i) a new set of headers 560 as well as (ii) the logical memory address indicating the payload data location. The host network stack 550 (or other software executing on the host computer), in some embodiments, tracks the status of the data message on the host computer to ensure that the correct logical memory address is sent with the corresponding set of updated headers. The new set of headers 560 may be the same as the headers 535 or could be modified (e.g., a new source and/or destination IP address due to network address translation, new source and/or destination MAC addresses due to routing, an updated time to live field, updated status fields to indicate that certain services have been performed, etc.).

The fourth stage 520 indicates that the smart NIC has translated the logical memory address 555 to identify the location of the payload data 540 in its local physical memory, read this data from memory, and output from the port 530 a new data message 565 using the new set of headers and the original payload data 540. The payload data 540 is never copied to the host computer I/O memory or copied back to the smart NIC memory, thereby saving host memory as well as processor resources.

Figure 6A:
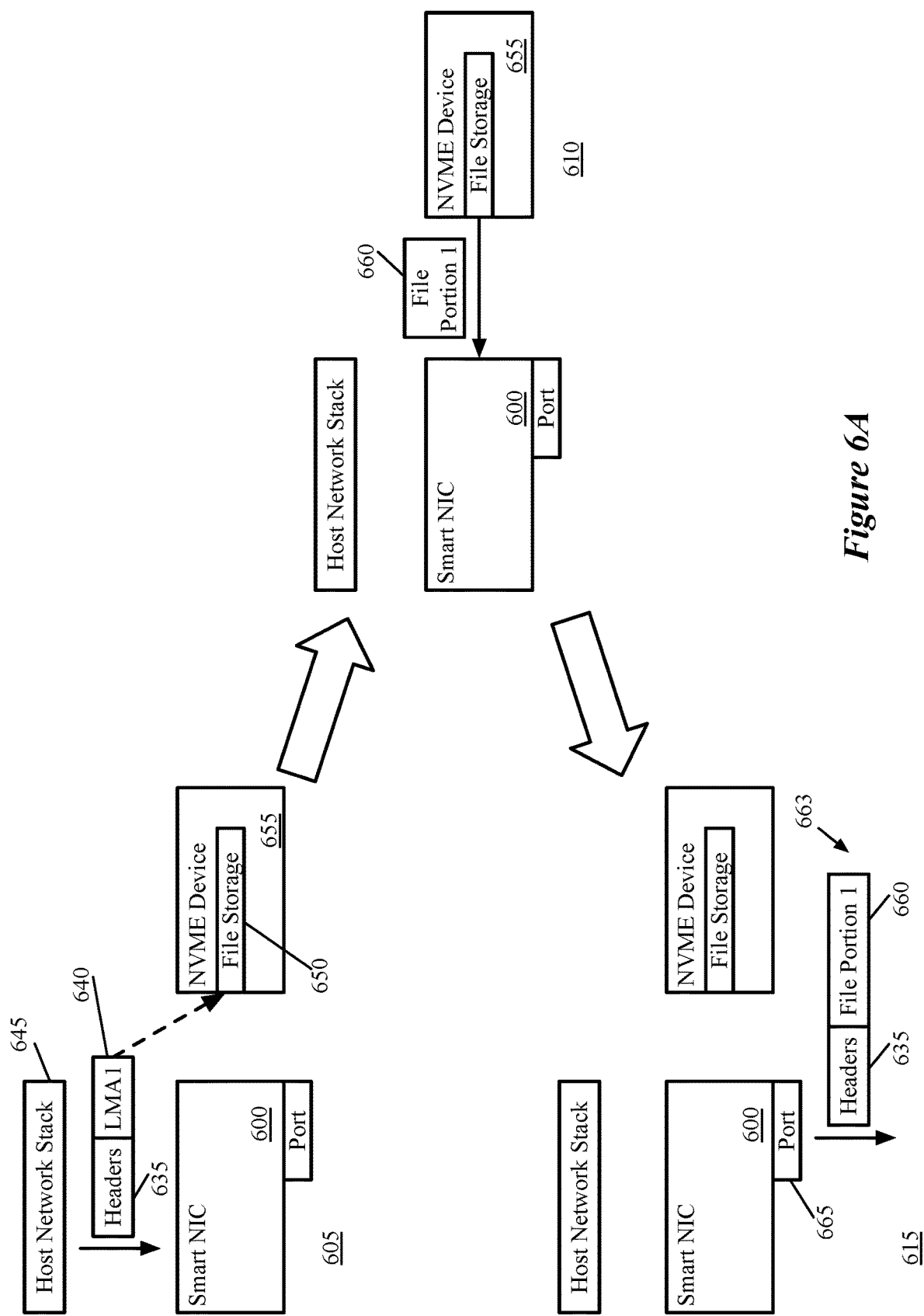
FIGS. 6A-B conceptually illustrate an example of sending a data file stored on an NVMe device at a computer.
Figure 6B:
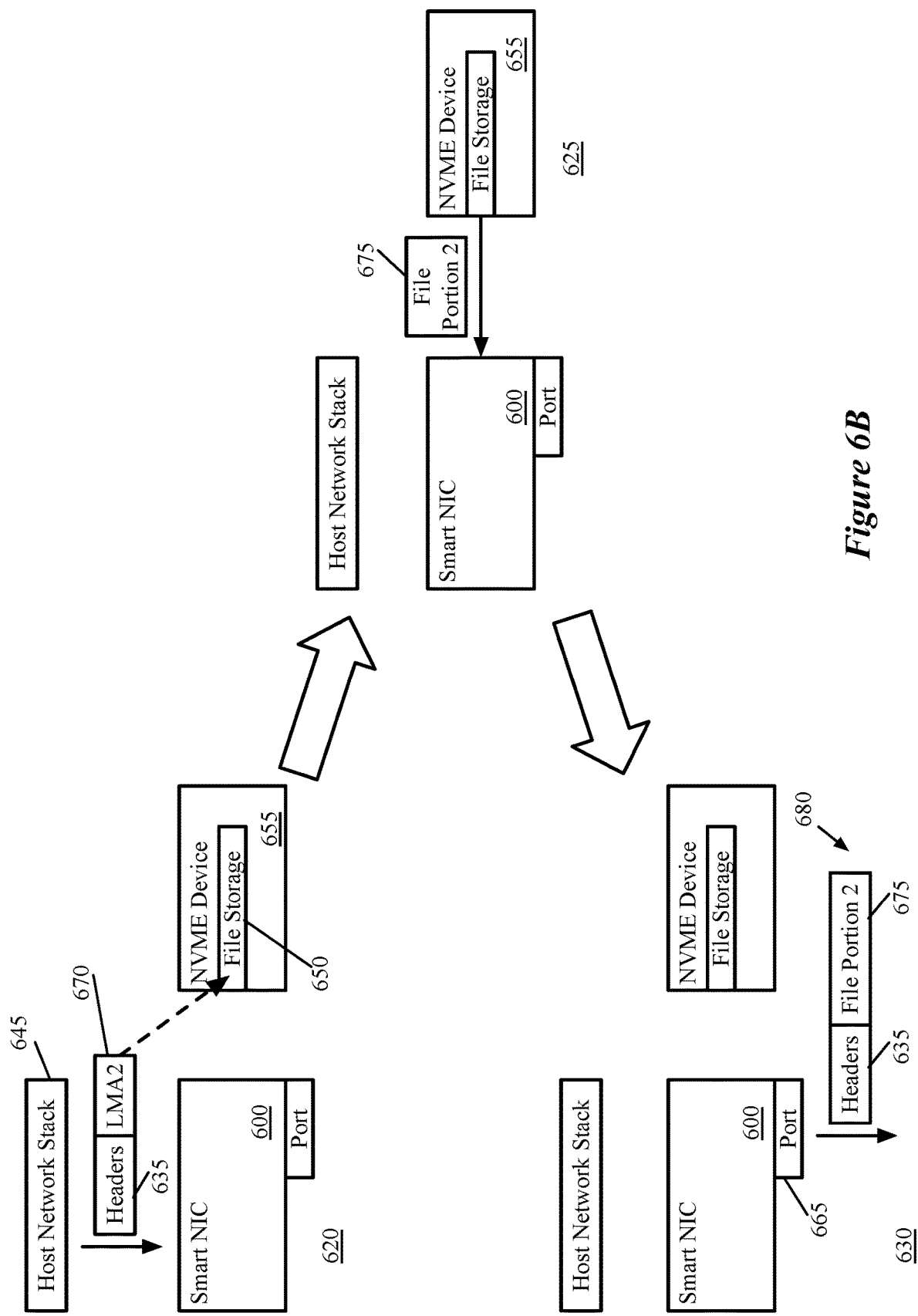

FIGS. 6A-B conceptually illustrate an example of sending a data file stored on an NVMe device at a computer over six stages 605-630. This process avoids the need to copy the data file from the NVMe device to the I/O virtual memory, instead, using the logical memory address translation to enable the NIC to directly read data from the NVMe device. As an example, the host computer could be a streaming service responding to a request for a stream of a song, movie, television show, etc. Other examples include a server storing a shared document or other file, or any other situation in which a file needs to be sent from its storage through a network.

The first stage 605 shows a smart NIC 600 receiving a set of headers 635 and a logical memory address 640 from a network stack 645 of a host computer. The logical memory address 640 references a portion of a data file 650 stored on an NVMe device 655 (connected to the NIC and host CPU by a PCIe bus, in some embodiments). The network stack 645 is configured to translate memory locations into logical memory addresses that can be used by the smart NIC 600. For instance, a client might provide the network stack 645 with information indicating the file to be sent out and the network stack 645 divides up this file (e.g., based on a maximum transmission unit size) and sends subsequent data message instructions to the NIC 600. In this case, because this is the first data message for transmitting the file 650, the logical memory address 640 specifies a first location for the beginning of the file and either (i) a second location for the end of the first portion of the file or (ii) an amount of data to include starting from the first location that should be sent along with the headers 635.

In the second stage 610, the smart NIC 600 translates the logical memory address into data identifying the NVMe device 655 as the location for the payload data and retrieves the specified portion 660 of the file from this NVMe device. That is, rather than requiring the network stack to retrieve the file portion 660 and then include this as part of the data message provided to the smart NIC 600, time and resources are saved by enabling the NIC 600 to directly retrieve this file portion 660. In the third stage 615, the smart NIC 600 assembles a data message 663 from the headers 635 and the first portion of the file 660 and sends this data message via its physical port 665.

The fourth stage 620 shows the host network stack 645 sending the same set of headers 635 with a second logical memory address 670 to the smart NIC. The second logical memory address 670 references a second portion of the data file 650 stored on the NVMe device 655. It should be noted that, in some embodiments, the headers for each subsequent data message are not exactly the same, as header fields such as sequence numbers may be changed from one data message to the next. However, even in this case, the majority of the header fields (e.g., source and destination addresses, protocol fields, transport layer port numbers, etc.) remain unchanged from one data message to the next. The second logical memory address 670 specifies a second location in the file (i.e., the end of the first portion and thus the beginning of the second portion) as well as either (i) a third location for the end of the second portion of the file or (ii) an amount of data to include starting from the second location that should be sent along with the headers 635.

In the fifth stage 625, the smart NIC 600 translates the second logical memory address 670 into data identifying the NVMe device 655 as the location for the payload data and retrieves the specified portion 675 of the file from this NVMe device. That is, rather than requiring the network stack to retrieve the file portion 675 and then include this as part of the data message provided to the smart NIC 600, time and resources are saved by enabling the NIC 600 to directly retrieve this file portion 675. In the sixth stage 630, the smart NIC 600 assembles a data message from the headers 635 and the second portion of the file 675 and sends this data message 680 via its physical port 665. Each subsequent data message is sent in this same way until the entire file is transmitted to its destination.

Figure 7:
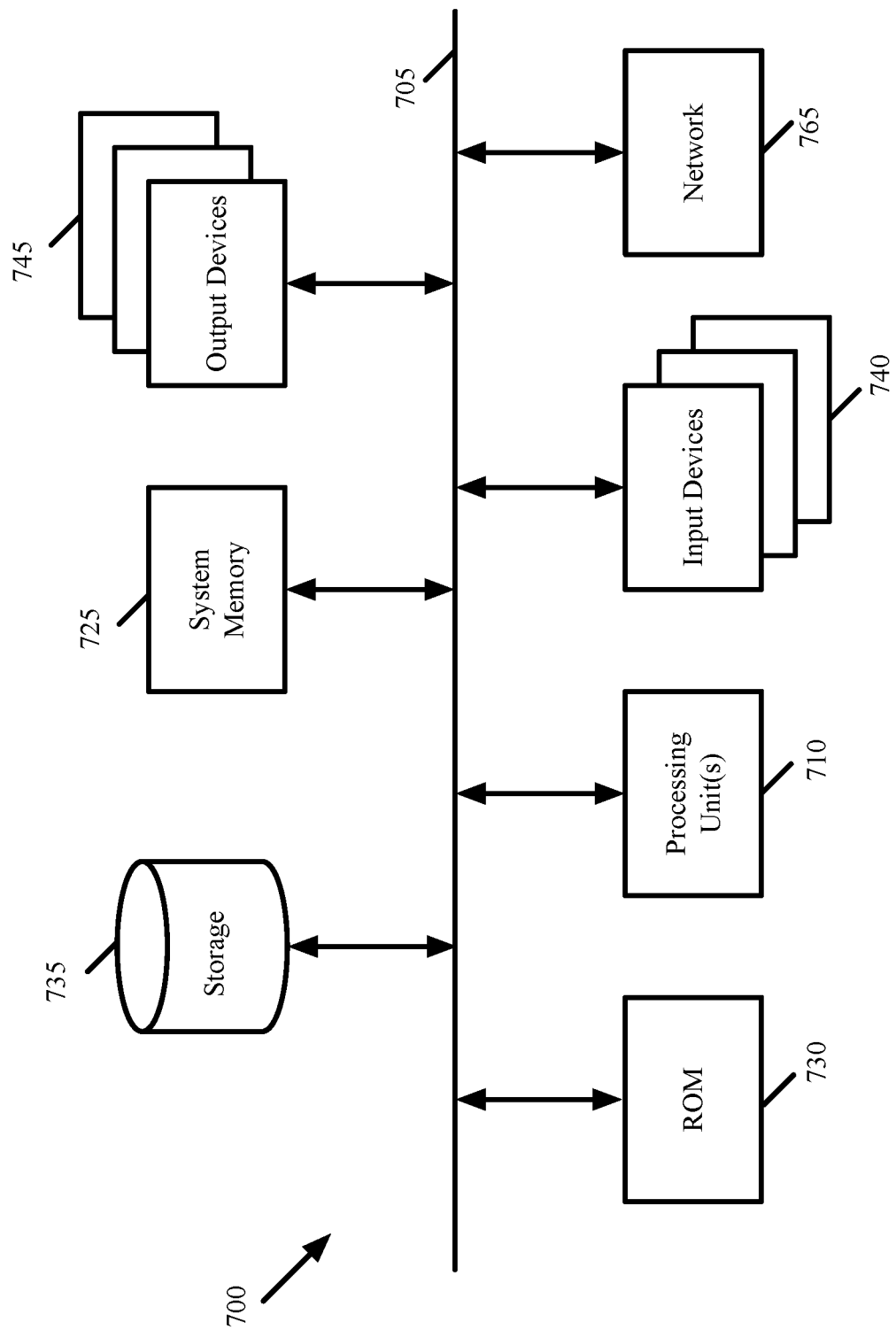
FIG. 7 conceptually illustrates an electronic system with which some embodiments of the invention are implemented.

FIG. 7 conceptually illustrates an electronic system 700 with which some embodiments of the invention are implemented. The electronic system 700 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 700 includes a bus 705, processing unit(s) 710, a system memory 725, a read-only memory 730, a permanent storage device 735, input devices 740, and output devices 745.

The bus 705 collectively represents all system, peripheral, and chipset buses that communicatively connect the numerous internal devices of the electronic system 700. For instance, the bus 705 communicatively connects the processing unit(s) 710 with the read-only memory 730, the system memory 725, and the permanent storage device 735.

From these various memory units, the processing unit(s) 710 retrieve instructions to execute and data to process in order to execute the processes of the invention. The processing unit(s) may be a single processor or a multi-core processor in different embodiments.

The read-only-memory (ROM) 730 stores static data and instructions that are needed by the processing unit(s) 710 and other modules of the electronic system. The permanent storage device 735, on the other hand, is a read-and-write memory device. This device is a non-volatile memory unit that stores instructions and data even when the electronic system 700 is off. Some embodiments of the invention use a mass-storage device (such as a magnetic or optical disk and its corresponding disk drive) as the permanent storage device 735.

Other embodiments use a removable storage device (such as a floppy disk, flash drive, etc.) as the permanent storage device. Like the permanent storage device 735, the system memory 725 is a read-and-write memory device. However, unlike storage device 735, the system memory is a volatile read-and-write memory, such a random-access memory. The system memory stores some of the instructions and data that the processor needs at runtime. In some embodiments, the invention's processes are stored in the system memory 725, the permanent storage device 735, and/or the read-only memory 730. From these various memory units, the processing unit(s) 710 retrieve instructions to execute and data to process in order to execute the processes of some embodiments.

The bus 705 also connects to the input and output devices 740 and 745. The input devices enable the user to communicate information and select commands to the electronic system. The input devices 740 include alphanumeric keyboards and pointing devices (also called "cursor control devices"). The output devices 745 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 7, bus 705 also couples electronic system 700 to a network 765 through a network adapter (not shown). In this manner, the computer can be a part of a network of computers (such as a local area network ("LAN"), a wide area network ("WAN"), or an Intranet, or a network of networks, such as the Internet. Any or all components of electronic system 700 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

This specification refers throughout to computational and network environments that include virtual machines (VMs). However, virtual machines are merely one example of data compute nodes (DCNs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses name spaces to isolate the containers from each other and therefore provides operating-system level segregation of the different groups of applications that operate within different containers. This segregation is akin to the VM segregation that is offered in hypervisor-virtualized environments that virtualize system hardware, and thus can be viewed as a form of virtualization that isolates different groups of applications that operate in different containers. Such containers are more lightweight than VMs.

Hypervisor kernel network interface modules, in some embodiments, is a non-VM DCN that includes a network stack with a hypervisor kernel network interface and receive/transmit threads. One example of a hypervisor kernel network interface module is the vmknic module that is part of the ESXi™ hypervisor of VMware, Inc.

It should be understood that while the specification refers to VMs, the examples given could be any type of DCNs, including physical hosts, VMs, non-VM containers, and hypervisor kernel network interface modules. In fact, the example networks could include combinations of different types of DCNs in some embodiments.

While the invention has been described with reference to numerous specific details, one of ordinary skill in the art will recognize that the invention can be embodied in other specific forms without departing from the spirit of the invention. In addition, a number of the figures (including FIG. 3) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

The invention claimed is:

1. A method for sending data messages, the method comprising:
    at a network interface controller (NIC) of a computer:
        from a network stack executing on the computer, receiving (i) a header for a data message to send and (ii) a logical memory address of a payload for the data message;
        identifying a particular one of a plurality of devices connected to the NIC by decoding a first set of N bits of the logical memory address, wherein the first set of N bits is associated with a device-specific translation table stored in the NIC;
        translating the logical memory address into a memory address for accessing the particular one of a plurality of devices connected to the computer;
        reading payload data from the memory address of the particular device; and
        sending the data message with the header received from the network stack and the payload data read from the particular device.

2. The method of claim 1, wherein the plurality of devices comprises at least a virtual memory of the computer and a physical memory of the NIC.

3. The method of claim 2, wherein the plurality of devices further comprises at least one non-volatile memory express (NVMe) device of the computer.

4. The method of claim 2, wherein the plurality of devices further comprises a memory associated with a graphics processing unit (GPU) of the computer.

5. The method of claim 1, wherein the data message is a first data message and the header is a first header, the method further comprising, prior to receiving the header and logical memory address from the network stack:
    receiving a second data message from a network to which the NIC connects, the second data message comprising a second header and the same payload as the first data message;
    storing the payload in a physical memory location of the NIC, the physical memory location having the logical memory address; and
    providing the second header and the logical memory address at which the payload is stored to the network stack of the computer.

6. The method of claim 5, wherein the computer performs a set of operations on the second header to derive the first header, the set of operations not requiring the payload of the second data message.

7. The method of claim 6, wherein the set of operations comprises at least one of a set of firewall operations, a set of load balancing operations, and a set of network address translation operations.

8. The method of claim 1, wherein the data message is a first data message, wherein the method further comprises, prior to receiving the header and logical memory address from the network stack:
    receiving a second data message requesting a set of data stored at the computer, the requested set of data comprising the payload data; and
    providing the second data message to the network stack of the computer.

9. The method of claim 8, wherein the logical memory address is a first logical memory address and the memory address for accessing the particular device is a first memory address, the method further comprising:
    from the network stack, receiving (i) a header for a third data message to send and (ii) a second logical memory address of a payload for the third data message;
    translating the second logical memory address into a second memory address for accessing the particular device;
    reading payload data for the third data message from the second memory address of the particular device; and
    sending the second data message with the header received from the network stack and the payload data read from the particular device.

10. The method of claim 9, wherein the headers for the first and third data messages are the same.

11. The method of claim 9, wherein the first and second memory addresses refer to portions of a same file requested by the second data message.

12. A non-transitory machine-readable medium storing a program for execution by at least one processing unit of a network interface controller (NIC) of a computer, the program for sending data messages, the program comprising sets of instructions for:
    from a network stack executing on the computer, receiving (i) a header for a data message to send and (ii) a logical memory address of a payload for the data message;

identifying a particular one of a plurality of devices connected to the NIC by decoding a first set of N bits of the logical memory address, wherein the first set of N bits is associated with a device-specific translation table stored in the NIC;

translating the logical memory address into a memory address for accessing the particular one of a plurality of devices connected to the computer;

reading payload data from the memory address of the particular device; and sending the data message with the header received from the network stack and the payload data read from the particular device.

13. The non-transitory machine-readable medium of claim 12, wherein the plurality of devices comprises at least a virtual memory of the computer and a physical memory of the NIC.

14. The non-transitory machine-readable medium of claim 13, wherein the plurality of devices further comprises at least one non-volatile memory express (NVMe) device of the computer.

15. The non-transitory machine-readable medium of claim 12, wherein the data message is a first data message and the header is a first header, the program further comprising sets of instructions for, prior to receiving the header and logical memory address from the network stack:

receiving a second data message from a network to which the NIC connects, the second data message comprising a second header and the same payload as the first data message;

storing the payload in a physical memory location of the NIC, the physical memory location having the logical memory address; and providing the second header and the logical memory address at which the payload is stored to the network stack of the computer.

16. The non-transitory machine-readable medium of claim 15, wherein the computer performs a set of operations on the second header to derive the first header, the set of operations not requiring the payload of the second data message.

17. The non-transitory machine-readable medium of claim 12, wherein the data message is a first data message, wherein the program further comprises sets of instructions for, prior to receiving the header and logical memory address from the network stack:

receiving a second data message requesting a set of data stored at the computer, the requested set of data comprising the payload data; and providing the second data message to the network stack of the computer.

18. The non-transitory machine-readable medium of claim 17, wherein the logical memory address is a first logical memory address and the memory address for accessing the particular device is a first memory address, the program further comprising sets of instructions for:

from the network stack, receiving (i) a header for a third data message to send and (ii) a second logical memory address of a payload for the third data message;

translating the second logical memory address into a second memory address for accessing the particular device;

reading payload data for the third data message from the second memory address of the particular device; and sending the second data message with the header received from the network stack and the payload data read from the particular device.

19. The non-transitory machine-readable medium of claim 18, wherein the headers for the first and third data messages are the same.

20. The non-transitory machine-readable medium of claim 18, wherein the first and second memory addresses refer to portions of a same file requested by the second data message.

* * * * *